(12) United States Patent
Dumais

(10) Patent No.: US 9,400,354 B2
(45) Date of Patent: Jul. 26, 2016

(54) WAVEGUIDE POLARIZATION ROTATOR AND METHOD OF CONSTRUCTION THEREOF

(71) Applicant: Huawei Technologies Co., Ltd., Shenzhen (CN)

(72) Inventor: Patrick Dumais, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/535,170

(22) Filed: Nov. 6, 2014

(65) Prior Publication Data

US 2016/0131835 A1    May 12, 2016

(51) Int. Cl.
| | |
|---|---|
| *G02B 6/26* | (2006.01) |
| *G02B 6/126* | (2006.01) |
| *G02B 6/10* | (2006.01) |
| *G02B 6/136* | (2006.01) |
| *G02B 6/27* | (2006.01) |
| *G02B 6/12* | (2006.01) |
| *G02B 6/14* | (2006.01) |

(52) U.S. Cl.
CPC ............... *G02B 6/126* (2013.01); *G02B 6/105* (2013.01); *G02B 6/107* (2013.01); *G02B 6/136* (2013.01); *G02B 6/2766* (2013.01); *G02B 6/14* (2013.01); *G02B 2006/12061* (2013.01); *G02B 2006/12152* (2013.01)

(58) Field of Classification Search
None
See application file for complete search history.

(56) References Cited

U.S. PATENT DOCUMENTS

| | | | | |
|---|---|---|---|---|
| 5,159,699 A | * | 10/1992 | de Monts | G01N 33/564 385/130 |
| 6,400,881 B1 | * | 6/2002 | Seino | G02B 6/125 385/10 |
| 8,494,314 B2 | * | 7/2013 | Studenkov | G02B 6/105 385/11 |

(Continued)

FOREIGN PATENT DOCUMENTS

| | | |
|---|---|---|
| CN | 101765796 A | 6/2010 |
| CN | 103261947 A | 8/2013 |

(Continued)

OTHER PUBLICATIONS

Dai et al., "Polarization management for silicon photonic integrated circuits," Laser Photonics Rev., 1-26 (no month 2012) DOI 10.1002/lpor.201200023, www.ipr-journal.org, 26 pages.

(Continued)

*Primary Examiner* — Mike Stahl
(74) *Attorney, Agent, or Firm* — Slater Matsil, LLP

(57) ABSTRACT

An embodiment waveguide polarization rotator includes an optical waveguide and an overlay strip. The optical waveguide has an input end and an output end oppositely disposed thereon. The optical waveguide is operable to receive, at the input end, an input optical signal having a mode having an input polarization. The optical waveguide is further operable to generate, at the output end, an output optical signal having an output polarization orthogonal to the input polarization. The overlay strip is disposed over and non-orthogonally crosses the optical waveguide. The overlay strip has a first end laterally offset from the optical waveguide by a first offset distance and a second end laterally offset from the optical waveguide by a second offset distance.

23 Claims, 7 Drawing Sheets

(56) References Cited

U.S. PATENT DOCUMENTS

| | | | |
|---|---|---|---|
| 2001/0038728 A1* | 11/2001 | Taylor | G02F 1/0134 385/11 |
| 2003/0026558 A1* | 2/2003 | Miyata | G02B 6/126 385/110 |
| 2008/0019637 A1 | 1/2008 | Little et al. | |
| 2012/0163750 A1* | 6/2012 | Chen | G02B 6/105 385/3 |
| 2014/0153861 A1 | 6/2014 | Peng et al. | |
| 2014/0270628 A1 | 9/2014 | Barwicz et al. | |
| 2014/0305902 A1 | 10/2014 | Jin et al. | |
| 2015/0063744 A1 | 3/2015 | Chen | |

FOREIGN PATENT DOCUMENTS

| | | |
|---|---|---|
| CN | 103336330 A | 10/2013 |
| CN | 103854669 A | 6/2014 |

OTHER PUBLICATIONS

Fukuda et al., "Polarization rotator based on silicon wire waveguides," Optics Express, vol. 16, No. 4, (Feb. 18, 2008), pp. 2628-2635.

Sacher et al., "Silicon-on-Insulator Polarization Splitter-Rotator Based on TM0-Te1 Mode Conversion in a Bi-level Taper," CLEO:2013 Technical Digest© OSA (no month 2013), 2 pages.

Vermeulen et al., "Silicon-on-Insulator Polarization Rotator Based on a Symmetry Breaking Silicon Overlay," IEEE Photonics Technology Letters, vol. 24, No. 6 (Mar. 15, 2012), pp. 482-484.

Caspers, et al., "Experiemental Demonstration of an integrated hybrid plasmonic polarization rotator," Optics Letters, vol. 38, No. 20, Oct. 15, 2013, 4 pages.

* cited by examiner

WAVEGUIDE POLARIZATION ROTATOR AND METHOD OF CONSTRUCTION THEREOF

TECHNICAL FIELD

The present invention relates generally to photonic devices, and, in particular embodiments, to a waveguide polarization rotator and a method of construction thereof.

BACKGROUND

Generally, single mode waveguides can support propagation of two distinct, orthogonally polarized modes. In integrated optics, the distinct modes are typically labeled transverse electric (TE) and transverse magnetic (TM). The TE and TM mode labels indicate the principal axis of polarization of the electrical field of the TE and TM modes are parallel and perpendicular to the waveguide substrate, i.e., wafer, plane, respectively. There can also be hybrid modes having a principal axis of polarization rotated with respect to the wafer plane.

Photonic components often have polarization-dependent properties. However, optical signal processing devices, such as, for example, switch matrices, should be polarization agnostic. Polarization agnostic is exemplified by having low polarization-dependent loss (PDL), low polarization mode dispersion (PMD), and few unfavorable polarization dependent wavelength characteristics caused by structural birefringence, among other features. A common approach to processing an incoming optical signal is to process both of the TE and TM modes separately and combine the results. Within a device, photonic components can be designed to process one of the TE and TM modes. Alternatively, either the TE or TM mode of the incoming optical signal can be rotated to the other's polarization. In such a device, a single design can be used to process both the TE and TM modes of the incoming optical signal. For example, the TM mode can be rotated to the TE polarization and photonic components designed for the TE mode can be used to process the TE mode and the rotated TM mode.

SUMMARY OF THE INVENTION

An embodiment waveguide polarization rotator includes an optical waveguide and an overlay strip. The optical waveguide has an input end and an output end oppositely disposed thereon. The optical waveguide is operable to receive, at the input end, an input optical signal having a mode having an input polarization. The optical waveguide is further operable to generate, at the output end, an output optical signal having an output polarization orthogonal to the input polarization. The overlay strip is disposed over and non-orthogonally crosses the optical waveguide. The overlay strip has a first end laterally offset from the optical waveguide by a first offset distance and a second end laterally offset from the optical waveguide by a second offset distance.

An embodiment method of constructing a waveguide polarization rotator includes forming an optical waveguide having an input end and an output end oppositely disposed thereon. A cladding layer is then formed over the optical waveguide. An overlay strip is then registered over the optical waveguide. The overlay strip includes a first end and a second end oppositely disposed thereon. The first end is laterally offset from the optical waveguide by a first offset distance and the second end is laterally offset from the optical waveguide by a second offset distance. The first end and the second end are oppositely disposed on either side of the optical waveguide. The method further includes forming the overlay strip over the cladding layer according to the registration.

An embodiment photonic circuit includes a polarization splitter, a waveguide polarization rotator, and a filter. The polarization splitter is configured to separate a received optical signal into a first mode and a second mode. The first mode and the second mode are orthogonal with respect to each other. The waveguide polarization rotator includes an optical waveguide having an input end and an output end oppositely disposed thereon. The optical waveguide is operable to receive, at the input end coupled to the polarization splitter, the first mode having an input polarization. The optical waveguide is further operable to generate, at the output end, an output optical signal having an output polarization orthogonal to the input polarization. The overlay strip is disposed over and non-orthogonally crosses the optical waveguide. The overlay strip includes a first end laterally offset from the optical waveguide by a first offset distance and a second end laterally offset from the optical waveguide by a second offset distance. The filter is coupled to the output end of the waveguide polarization rotator and is configured to apply a transfer function designed for the second mode to the output optical signal from the waveguide polarization rotator.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
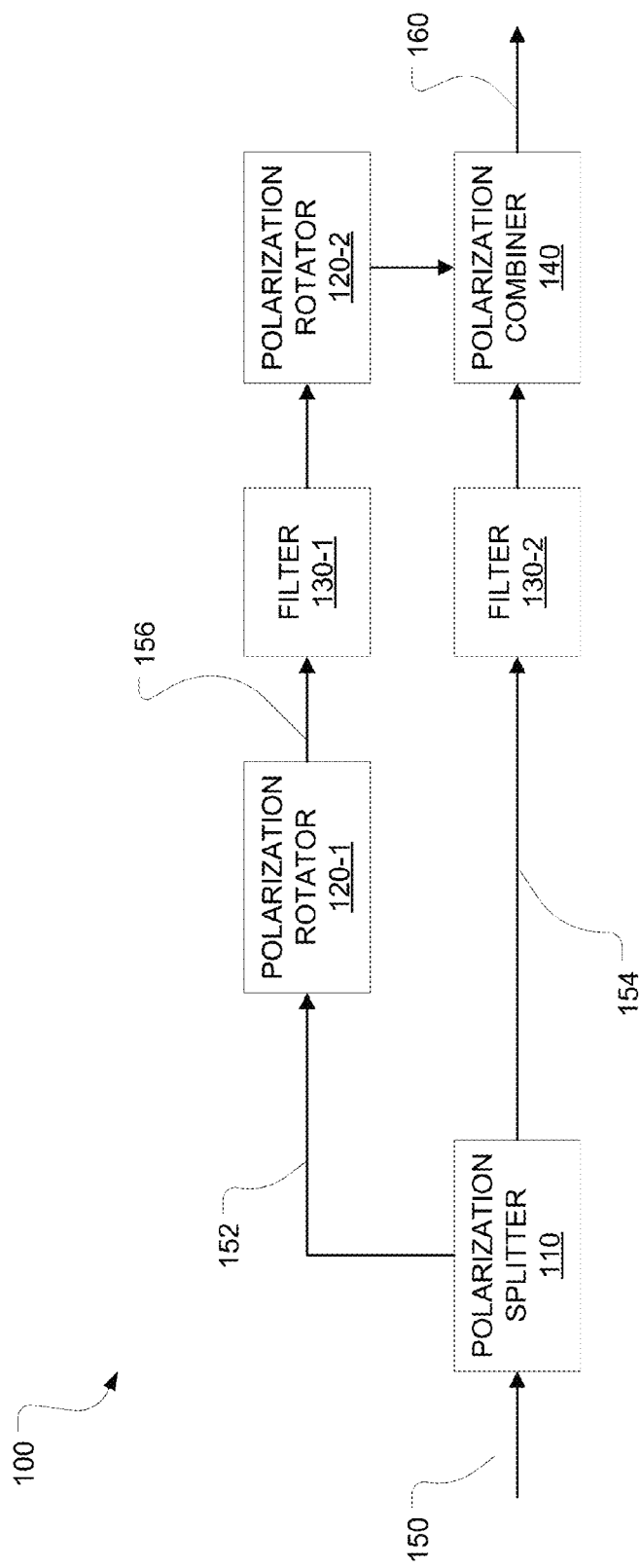
FIG. 1 is a block diagram of one embodiment of a photonic circuit for processing both a TE mode and a TM mode of an incoming optical signal.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

In free space optics, a linear polarization state can be rotated by 90 degrees by a half-waveplate having principal axes oriented 45 degrees with respect to the initial polarization state. For photonic circuits, the equivalent rotation can be accomplished with a waveguide polarization rotator having hybrid modes with principal axes rotated 45 degrees with respect to the wafer plane of the waveguide. The waveguide polarization rotator should also have a length determined to achieve the desired amount of rotation. Horizontal and vertical asymmetry in the waveguide cross-sections provide the necessary hybrid modes and coupling between the TE and TM polarizations.

Producing asymmetry in a waveguide cross-section typically involves at least two photolithography steps. Generally, in fabrication processes that include a waveguide layer and an overlay layer, the first step defines the waveguide features and a second step defines features of an overlay that creates the desired asymmetry. Typically, a cladding layer is formed between the waveguide and overlay. It is realized herein that the alignment of the waveguide and overlay, a process referred to as registration, is critical in constructing a quality waveguide polarization rotator. In particular, the orientation of the polarization axes of the resulting structure can impact PDL and polarization crosstalk. Commercial photolithography processes can register the waveguide and overlay to within a few tens of nanometers in the lateral and longitudinal dimensions. In certain types of photonic circuits, for example, silicon nanowire waveguides with a polysilicon overlay, the registration tolerance is on the order of a few tens of nanometers, meaning commercial photolithography processes can still produce noticeable degrees of imperfection.

It is realized herein that a waveguide polarization rotator can be constructed that is insensitive to registration error. Given the waveguide, with features defined by a first fabrication step, including material, thickness, width, and length, an overlay strip can be designed with sufficient length, width, and thickness that crosses the waveguide non-orthogonally to produce the necessary vertical asymmetry to produce the desired hybrid modes. To cross non-orthogonally is to cross at an angle, $\alpha$, where $0<\alpha<90$ degrees. The length of the overlay strip is designed such that each end is laterally offset sufficiently from the waveguide that the fundamental modes of the waveguide are not affected by the overlay strip. The fundamental modes of the waveguide are computed by solving the Maxwell equations for a cross-section of the waveguide polarization rotator. Where the crossing overlay strip does affect the fundamental modes of the waveguide, the overlay strip forms two adiabatic rotation regions with the waveguide. The two adiabatic rotation regions are symmetric about a line drawn at the length-wise center of the waveguide polarization rotator and perpendicular to the waveguide. The waveguide polarization rotator produces hybrid modes having principal axes rotated 45 degrees from the wafer plane at the inner boundaries of the adiabatic rotation regions. The overlay strip may be formed so as to form a first adiabatic rotation region where the overlay strip begins to cross the optical waveguide nearest a first end of the overlay strip, and to form a second adiabatic rotation region where the overlay strip begins to cross the optical waveguide nearest a second end of the overlay strip. The first and second adiabatic regions each may rotate a polarization of a mode at least 30 degrees relative to a substrate plane of the optical waveguide.

Before describing various embodiments of the waveguide polarization rotator introduced herein, a photonic circuit within which the waveguide polarization rotator may be embodied is described.

FIG. 1 is a block diagram of one embodiment of a photonic circuit 100 for processing both a TE mode and a TM mode of an incoming optical signal. Photonic circuit 100 includes a polarization splitter 110, a polarization rotator 120-1, filters 130-1 and 130-2, a polarization rotator 120-2, and a polarization combiner 140. Polarization splitter 110 is serially coupled with polarization rotator 120-1, filter 130-1, polarization rotator 120-2, and polarization combiner 140 along one path; and serially coupled with filter 130-2 and polarization combiner 140 along another path.

Polarization splitter 110 is configured to receive an input optical signal 150. Polarization splitter 110 separates input optical signal 150 into a TE mode 154 and a TM mode 152. TE mode 154 propagates to filter 130-2, which applies a transfer function to the optical signal before passing it along to polarization combiner 140. TM mode 152 propagates to polarization rotator 120-1 where its polarization is rotated by 90 degrees to the polarization of the TE mode, yielding a rotated TM mode 156. Filter 130-1 applies the same transfer function of filter 130-2 to rotated TM mode 156. At this stage of photonic circuit 100, TE mode 154 and TM mode 152 of input optical signal 150 have both been filtered and have principal axes the polarization of TE mode 154. Rotated TM mode 156 is then rotated back to its initial TM polarization by polarization rotator 120-2. Polarization combiner 140 combines the two polarizations into an output optical signal 160.

Figure 2:
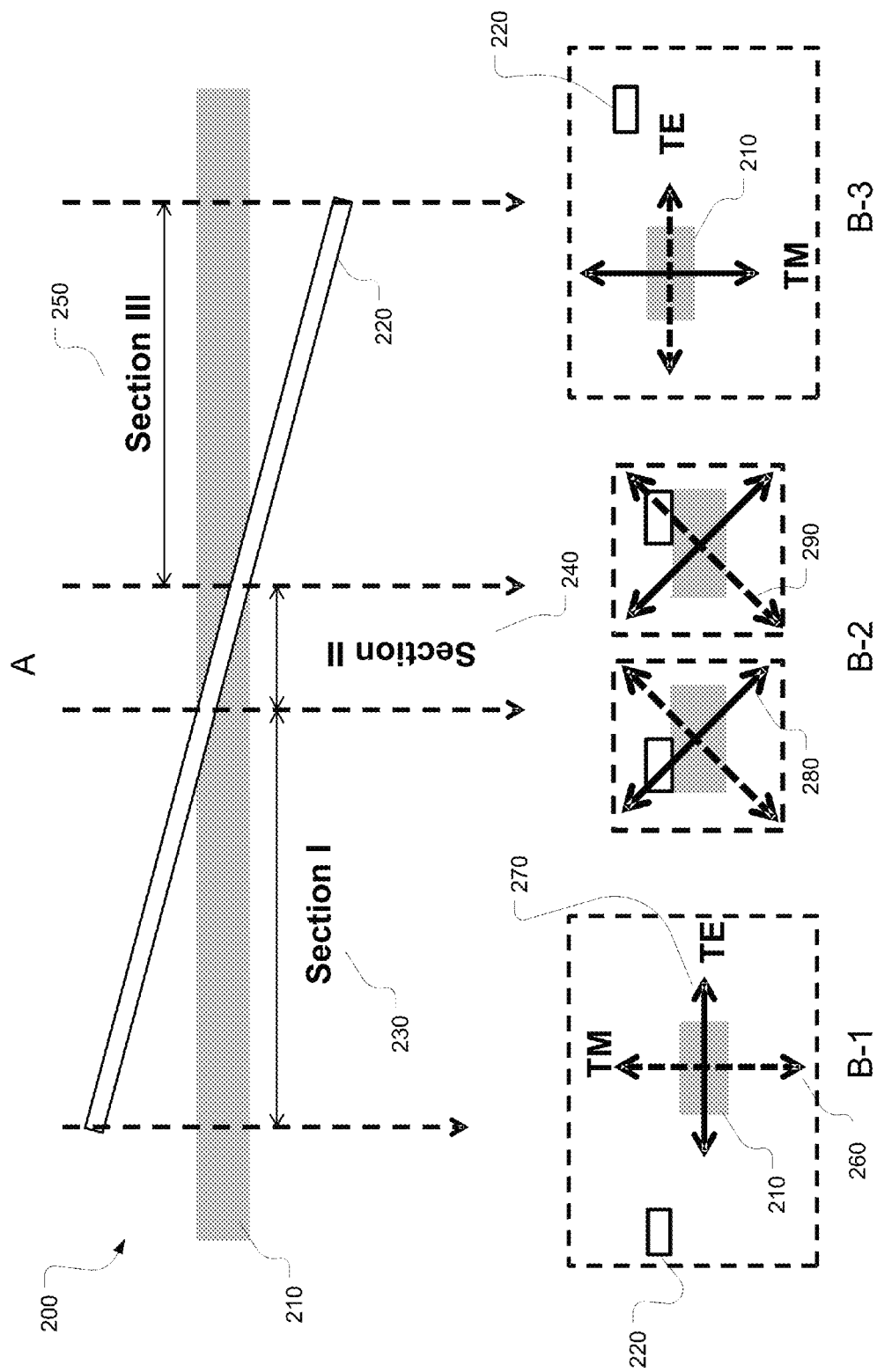
FIG. 2 is an illustration of one embodiment of a waveguide polarization rotator.

FIG. 2 is an illustration of one embodiment of a waveguide polarization rotator 200. FIG. 2-A is a top perspective of waveguide polarization rotator 200. FIG. 2-B illustrates three cross-section perspectives of waveguide polarization rotator 200 corresponding to three length-wise sections of waveguide polarization rotator 200.

In FIG. 2-A, waveguide polarization rotator 200 includes an optical waveguide 210 and an overlay strip 220. Optical waveguide 210 can be fabricated using a variety of techniques, including silicon nanowire, silicon-on-insulator, silicon-on-silica, Indium Phosphide (InP), and Gallium Arsenide (GaAs), among others. In a silicon nanowire embodiment, a crystalline silicon layer is formed on a silicon wafer with a silica layer on top. The crystalline silicon layer is then etched as desired to form optical waveguide 210. Typically, in photonic components such as waveguide polarization rotator 200, optical waveguide 210 and overlay strip 220 would be separated by a cladding layer. Cladding is one or more layers of low-refractive index (relative to the waveguide core) material, e.g., silica cladding on silicon core, that operates to contain electromagnetic waves within the waveguide core. Overlay strip 220 is an additional propagating layer formed over the cladding and optical waveguide 210. One overlay technique includes forming amorphous silicon over the cladding layer, etching the amorphous silicon as desired, and annealing the remaining amorphous silicon to form polycrystalline silicon, sometimes referred to as polysilicon.

Waveguide polarization rotator 200 is divided into the three length-wise sections, 230, 240 and 250. In the first section 230, an input optical signal propagates from left to right. The input optical signal includes a TE mode and a TM mode, as shown in FIG. 2-B by the dashed and solid principal axes. FIG. 2-B-1 is a cross-section of waveguide polarization rotator 200 at the left boundary of the first section 230. Overlay strip 220 is shown above optical waveguide 210 and offset to the left, which corresponds with the upper-left end of overlay strip 220. As the input optical signal propagates along the first section 230 and overlay strip 220 gets closer to optical waveguide 210, the TE and TM modes undergo an adiabatic transition to a hybrid mode having principal axes rotated 45 degrees with respect to the initial polarization shown in FIG. 2-B-1.

When the optical signal reaches the boundary between the first section 230 and the second section 240, the TE and TM modes have each rotated 45 degrees, as illustrated in FIG. 2-B-2. The cross-section shows overlay strip 220 above optical waveguide 210, where it impacts the fundamental modes of optical waveguide 210 and forming the hybrid modes. The hybrid modes couple from the adiabatic rotation region in the first section 230 into the waveguide structure in the second section 240 formed by optical waveguide 210 and overlay strip 220. As the optical signal propagates through the second section 240, the net polarization rotation is zero. This is achieved by either little to no polarization rotation throughout, or by one or more complete rotations, i.e., 360 degrees. In the former scenario, the beat length of the hybrid modes is much longer than the length of the second section 240, yielding no significant rotation. In the latter scenario, where the polarization of the hybrid modes rotates as the optical signal propagates, the length of the second section 240 is designed such that the polarization of the hybrid modes is the same at the boundary between the second section 240 and the third section 250 as at the boundary between the first section 230 and the second section 240, which is illustrated in FIG. 2-B-2 by the symmetry of the two cross-sections. The length of the second section 240 is dictated by the length of overlay strip 220 and the lateral offsets of the ends of overlay strip 220 from optical waveguide 210, among other design features of optical waveguide 210 and overlay strip 220, including material, thickness, width, and cladding.

At the boundary between the second section 240 and the third section 250, the TE and TM modes each couple to their complementary, i.e., rotated 90 degrees, mode in the third section 250. Due to the symmetry of the first section 230 and the third section 250, the adiabatic rotation region in the third section rotates the polarization of the hybrid modes back to the original orientation, i.e., −45 degrees, of the TE and TM modes of the input optical signal. However, since the hybrid modes are coupled into their complements at the left boundary of the third section 250, the polarization of the modes of the optical signal rotate an additional 45 degrees, i.e., +45 degrees, as it propagates through the third section 250, yielding a net 90 degree polarization rotation. At the right end of waveguide polarization rotator 200, as shown in FIG. 2-B-3, the mode represented by the dashed principal axis is parallel to the substrate plane, i.e., the TE polarization, and the mode represented by the solid principal axis is normal to the substrate plane, i.e., the TM polarization. Furthermore, overlay strip 220 is offset to the right of optical waveguide 210, where it does not impact the fundamental modes of optical waveguide 210. Because overlay strip 220 does not impact the fundamental modes of optical waveguide 210 at the beginning of section I and at the end of Section III, a fundamental mode of the optical waveguide is equal to a fundamental mode of the waveguide polarization rotator at the first end and at the second end of the overlay strip.

The boundaries of the three sections 230, 240, and 250 are idealized. In practice, the boundaries in an embodiment waveguide polarization rotator are not clearly defined, as there is a continuous transformation of the cross-section of waveguide polarization rotator 200 along the propagation axis. To achieve ideal performance, which is a net 90 degree polarization rotation, the orientation of the polarization can vary from the ideal 45 degree orientations of the principal axes at the boundaries of the second section 240. Likewise, the actual rotation accomplished by an embodiment waveguide polarization rotator can vary from 90 degrees.

Figure 3:
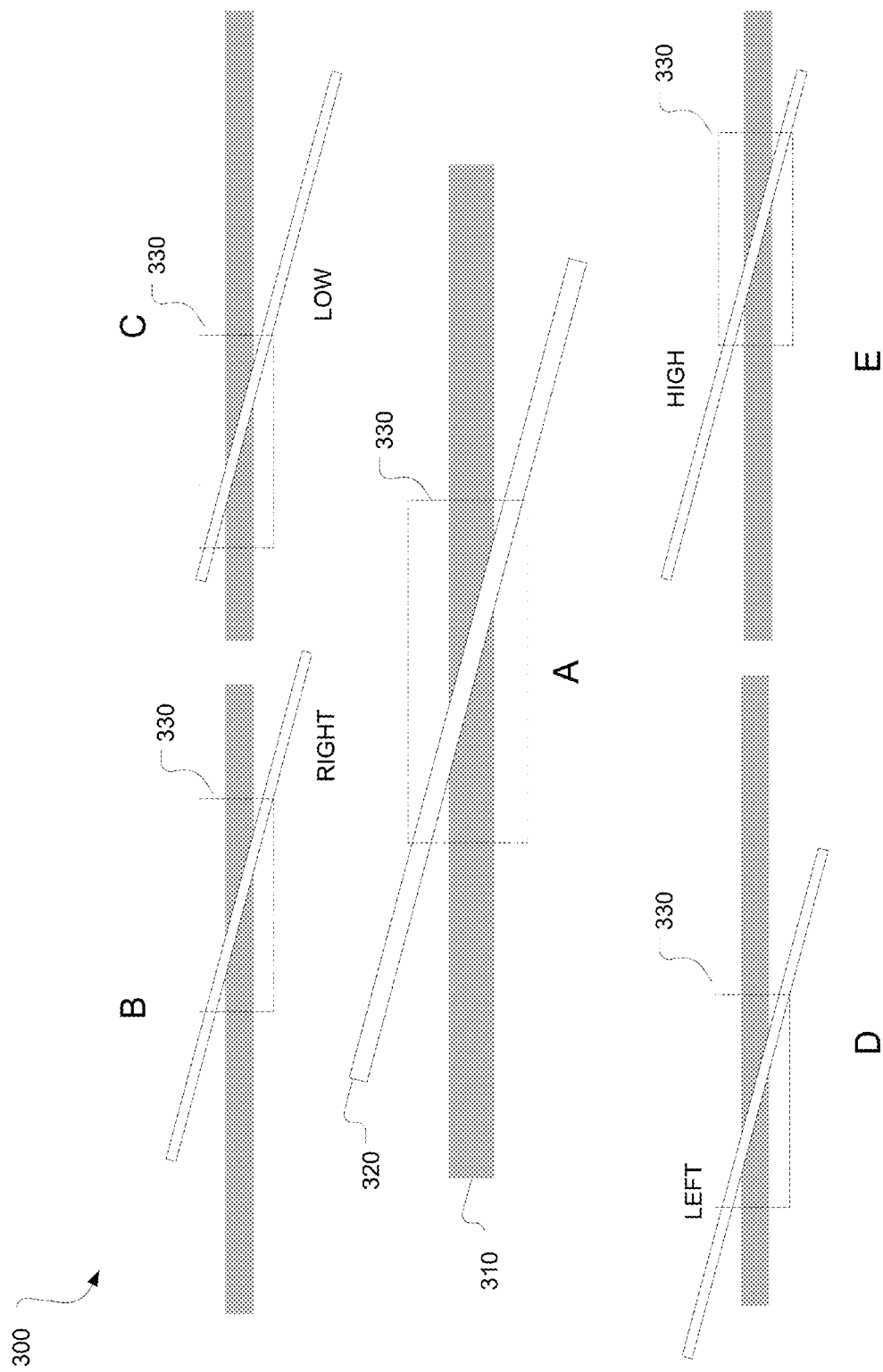
FIG. 3 is an illustration of registration insensitivity of one embodiment of a waveguide polarization rotator.

FIG. 3 is an illustration of registration insensitivity of one embodiment of a waveguide polarization rotator 300. Waveguide polarization rotator 300 includes an optical waveguide 310 and an overlay strip 320. The portion of waveguide polarization rotator 300 where overlay strip 320 crosses optical waveguide 310 is considered a rotation region 330. Within rotation region 330, waveguide polarization rotator 300 operates as the embodiment of FIG. 2 described above. The lengths of optical waveguide 310 and overlay strip 320 are designed such that the overall device is insensitive to registration errors that occur in the fabrication process.

During registration, overlay strip 320 is located over optical waveguide 310 and is aligned vertically and horizontally to within some tolerance for the process. For example, certain photolithography processes are accurate to within a few tens of nanometers. Assuming the lengths of optical waveguide 310 and overlay strip 320 are sufficiently long, horizontal and vertical variances in the registration, or location, of overlay strip 320 over optical waveguide 310 have no impact on the performance of rotation region 330. FIG. 3-A represents a target registration having rotation region 330 centered horizontally over optical waveguide 310 and overlay strip 320 centered along its own length through rotation region 330.

During fabrication, registration can vary vertically and horizontally as illustrated by FIGS. 3-B through 3-E. FIG. 3-B illustrates the location of rotation region 330 within waveguide polarization rotator 300 when registration yields an error biasing overlay strip 320 right. FIG. 3-C illustrates the location of rotation region 330 within waveguide polarization rotator 300 when registration yields an error biasing overlay strip 320 down. FIG. 3-D illustrates the location of rotation region 330 within waveguide polarization rotator 300 when registration yields an error biasing overlay strip 320 left. FIG. 3-E illustrates the location of rotation region 330 within waveguide polarization rotator 300 when registration yields an error biasing overlay strip 320 up.

Evident among FIGS. 3-B through 3-E, when the axis of propagation of optical waveguide 310 is oriented horizontally, horizontal registration error produces a rotation region that shifts horizontally with the error, as is expected and shown in FIGS. 3-B and 3-D. Vertical registration error, perhaps less intuitively, also shifts rotation region 330 horizontally, but less so than horizontal registration error.

Figure 4:
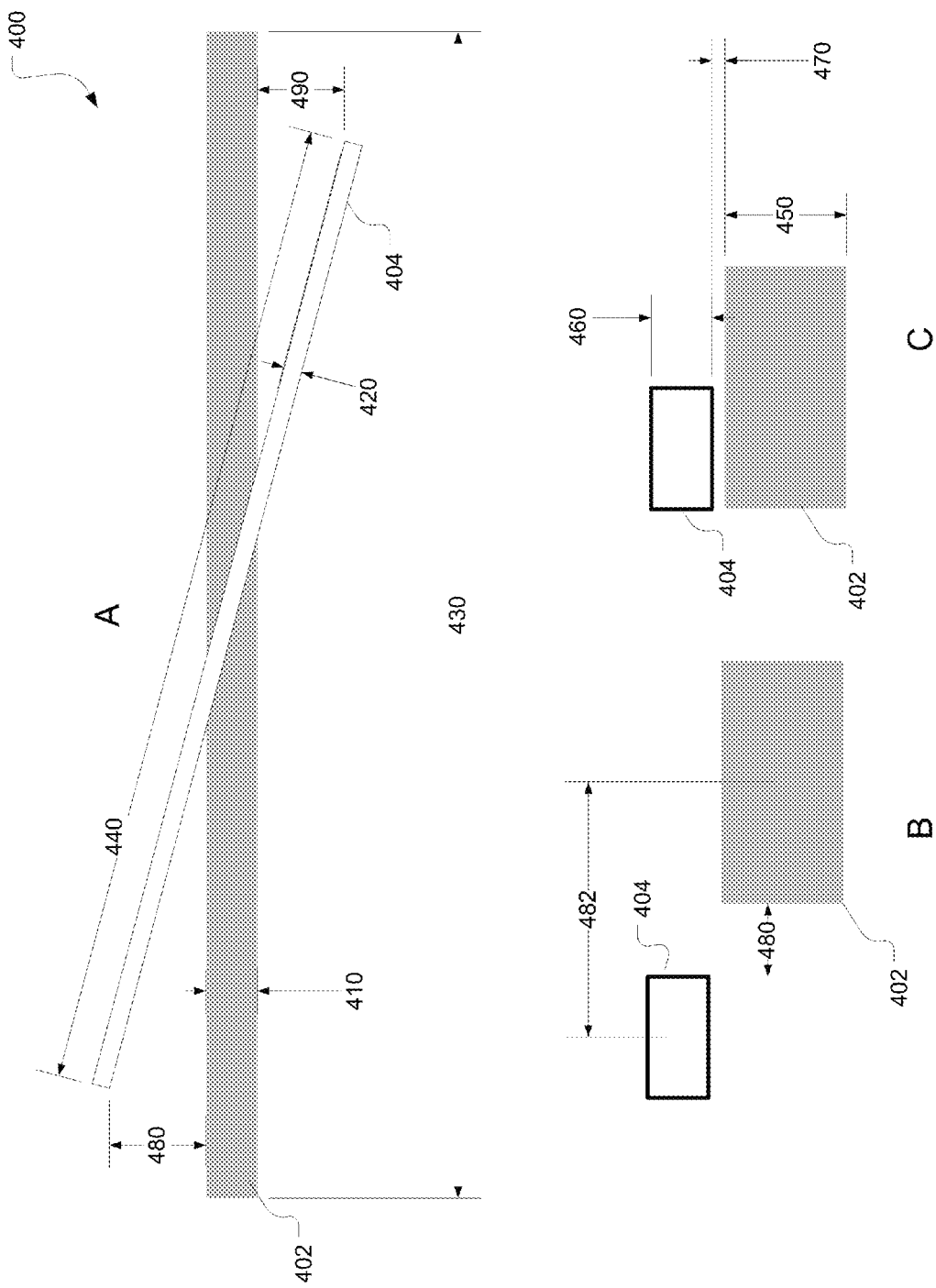
FIG. 4 is another illustration of one embodiment of a waveguide polarization rotator.

FIG. 4 is another illustration of one embodiment of a waveguide polarization rotator 400. FIG. 4 illustrates the dimensions of waveguide polarization rotator 400, which includes an optical waveguide 402 and an overlay strip 404. FIG. 4-A illustrates a top perspective of waveguide polarization rotator 400, while FIGS. 4-B and 4-C illustrate various cross-sections.

Optical waveguide 402 has a width 410, a length 430, and a height, or thickness, 450. Optical waveguide 402 is separated from overlay strip 404 by a cladding layer having a thickness 470. Overlay strip 404 has a width 420, a length 440, and a thickness 460. In certain embodiments, overlay width 420 is no greater than waveguide width 410. Registration of overlay strip 404 over optical waveguide 402 is done according to a first offset 480 and a second offset 490. First offset 480 is defined purely in the substrate plane of optical waveguide 402 and is measured from an edge of optical waveguide 402 to the nearest edge of overlay strip 404. In alternative embodiments, as illustrated in FIG. 4-B, a center-to-center offset 482 can be defined from the center of optical waveguide 402 to the center of overlay strip 404. Second offset 490 can be similarly defined, but on the opposite side of optical waveguide 402. First offset 480 and second offset 490 can be determined by solving the Maxwell equations for the waveguide structure formed by optical waveguide 402 and overlay strip 404 to find a minimum offset at which overlay strip 404 does not impact the fundamental modes of optical waveguide 402. Alternatively, several "mode solvers" and simulation systems are commercially available to experimentally determine the offsets. The minimum offset can also be increased to accommodate anticipated registration and fabrication error. More specifically, when optical waveguide 402 is oriented with its axis of propagation horizontal, first offset 480 and second offset 490 can include a vertical tolerance for registration and fabrication error. The first offset distance and the second offset distance can include a tolerance portion determined according to fabrication tolerances for forming the optical waveguide and for forming the overlay strip.

Overlay length 440 can be determined to satisfy the offset values determined for first offset 480 and second offset 490, in addition to having a sufficiently long adiabatic rotation regions as illustrated in FIG. 2. Overlay length 440 can also include a tolerance for horizontal registration and fabrication error.

Figure 5:
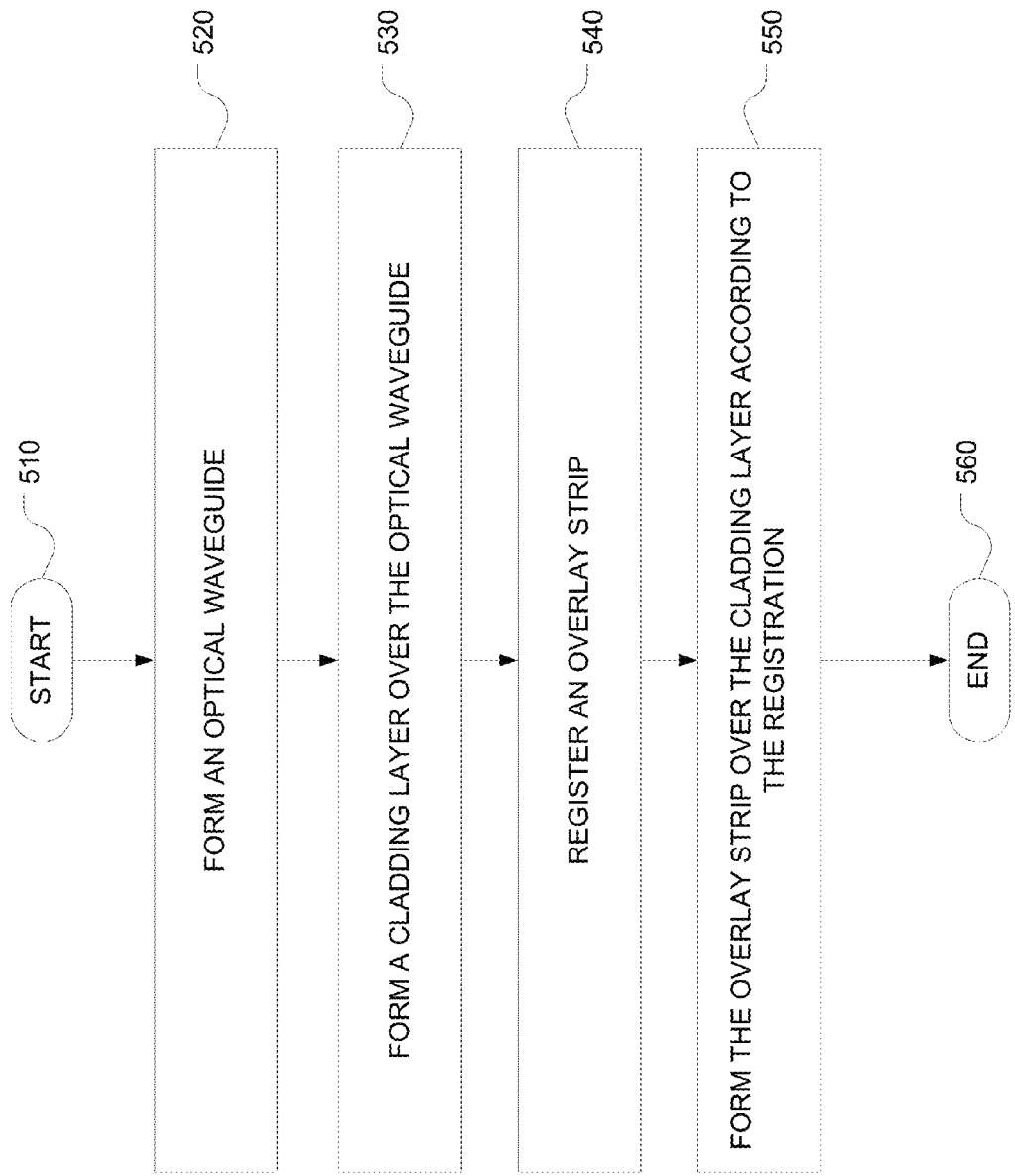
FIG. 5 is a flow diagram of one embodiment of a method of constructing a waveguide polarization rotator.

FIG. 5 is a flow diagram of one embodiment of a method of constructing a waveguide polarization rotator. The method begins at a start step 510. At a first forming step 520, an optical waveguide is formed. The optical waveguide has an input end and an output end that are oppositely disposed on the waveguide. At a second forming step 530, a cladding layer is formed over the optical waveguide. At a registration step 540, an overlay strip is registered over the optical waveguide. The overlay strip has a first end and a second end oppositely disposed on the overlay. The first end is laterally offset from the optical waveguide by a first offset distance. The second end is laterally offset from the optical waveguide by a second offset distance. The overlay non-orthogonally crosses the optical waveguide, therefore disposing the first end and the second end of the overlay strip on opposite sides of the optical waveguide. The overlay strip is then formed at a third forming step 550. The method then ends at an end step 560.

Figure 6:
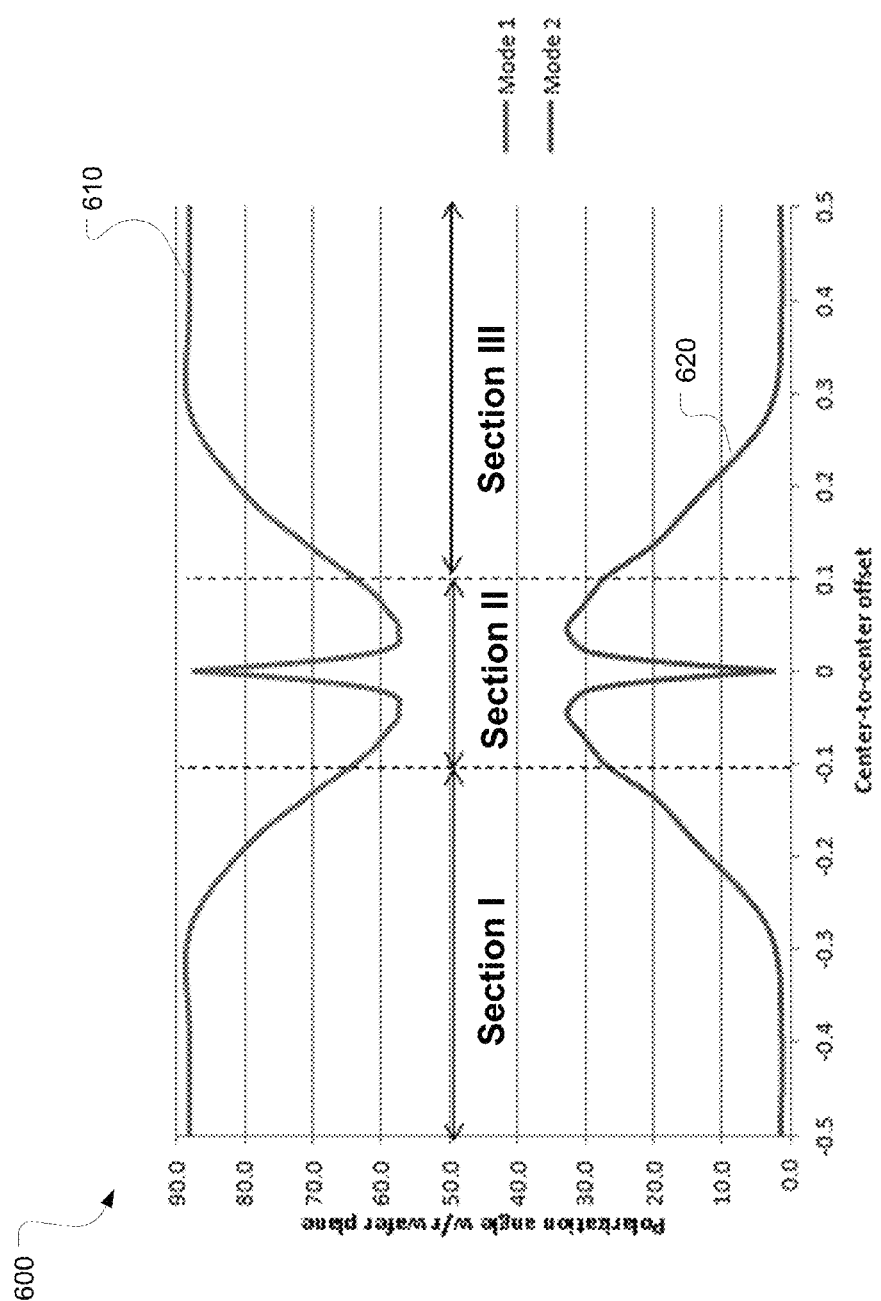
FIG. 6 is a plot of polarization angle relative to the wafer plane as a function of overlay offset.

FIG. 6 is a plot 600 of polarization angle relative to the wafer plane for an embodiment waveguide polarization rotator. Plot 600 includes a first mode 610 and a second mode 620. Polarizations of first mode 610 and second mode 620 are computed as functions of the offset of the overlay strip from the optical waveguide in microns. Plot 600 illustrates polarization as a function of overlay offset for a specific set of optical waveguide and overlay strip dimensions. Polarization is also largely dependent on widths, lengths, material, and thickness of the optical waveguide and overlay strip.

A given mode propagating through the embodiment waveguide polarization rotator would undergo a gradual 90 degree polarization rotation. For example, first mode 610 arrives at section 1 with a polarization of approximately 90 degrees with respect to the wafer plane. As first mode 610 enters section 2, according to plot 600, its main axis of polarization is approximately 55 degrees with respect to the wafer plane. Due to symmetry, first mode 610 transitions out of section 2 with the same polarization. However, rather than following the plot line for first mode 610, first mode 610 couples into its complementary mode at the boundary of section 2 and section 3. First mode 610 undergoes a net 90 degree polarization rotation as it follows the plot line for second mode 620. Second mode 620 undergoes a similar rotation as it propagates through the embodiment waveguide polarization rotator.

Figure 7:
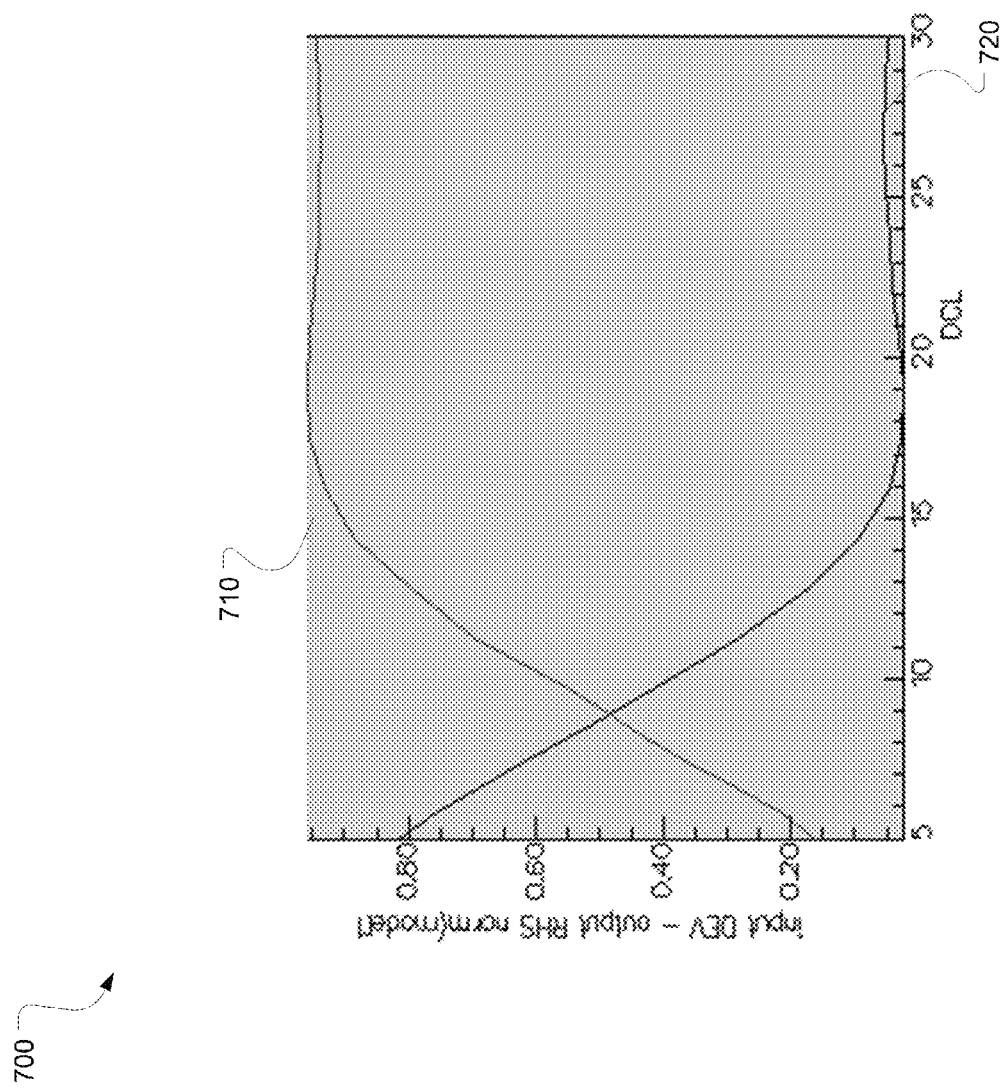
FIG. 7 is a plot of transmission power as a function of overall device length.

FIG. 7 is a plot 700 of transmission power as a function of device length in microns. Device length refers to the length of the rotation region in a waveguide polarization rotator having dimensions equal to those for plot 600 in FIG. 6. Plot 700 shows a TM mode 710 and a TE mode 720. Plot 700 also illustrates that for the given optical waveguide and overlay strip dimensions, and given first offset 480 and second offset 490, the optimum length is roughly 19 microns.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A waveguide polarization rotator, comprising:
   an optical waveguide having an input end and an output end oppositely disposed thereon, the optical waveguide operable to:
      receive, at the input end, an input optical signal having a mode having an input polarization, and
      generate, at the output end, an output optical signal having an output polarization orthogonal to the input polarization; and
   an overlay strip disposed over and non-orthogonally crossing the optical waveguide, and having a first end laterally offset from the optical waveguide by a first offset distance and a second end laterally offset from the optical waveguide by a second offset distance, wherein the optical waveguide has a waveguide width and the overlay strip has an overlay width no greater than the waveguide width.

2. The waveguide polarization rotator of claim 1 wherein the overlay strip comprises polysilicon.

3. The waveguide polarization rotator of claim 1 wherein a fundamental mode of the optical waveguide is equal to a fundamental mode of the waveguide polarization rotator at the first end and at the second end of the overlay strip.

4. The waveguide polarization rotator of claim 1 further comprising a cladding layer disposed between the optical waveguide and the overlay strip.

5. The waveguide polarization rotator of claim 1 wherein the optical waveguide comprises a silicon nanowire waveguide.

6. The waveguide polarization rotator of claim 1 wherein a principal axis of the mode of the input optical signal is parallel to a substrate plane of the waveguide polarization rotator.

7. A method of constructing a waveguide polarization rotator, comprising:
   forming an optical waveguide having an input end and an output end oppositely disposed thereon;
   forming a cladding layer over the optical waveguide;
   registering an overlay strip having a first end and a second end oppositely disposed thereon, wherein:
      the first end is laterally offset from the optical waveguide by a first offset distance and the second end is laterally offset from the optical waveguide by a second offset distance, and
      the first end and the second end are oppositely disposed on either side of the optical waveguide; and
   forming the overlay strip over the cladding layer according to the registering.

8. The method of claim 7 wherein the forming the optical waveguide comprises forming silicon on an insulator substrate.

9. The method of claim 7 wherein the forming the cladding layer comprises forming silica around the optical waveguide.

10. The method of claim 7 wherein the forming the overlay strip comprises forming polysilicon over the cladding layer.

11. The method of claim 7 wherein the first offset distance comprises a tolerance portion determined according to fabrication tolerances for the forming the optical waveguide and the forming the overlay strip.

12. The method of claim 7 wherein the forming the overlay strip comprises:
   forming a first adiabatic rotation region where the overlay strip begins to cross the optical waveguide nearest the first end of the overlay strip; and forming a second adiabatic rotation region where the overlay strip begins to cross the optical waveguide nearest the second end of the overlay strip.

13. The method of claim 12 wherein the first adiabatic rotation region is operable to rotate a polarization of a mode at least 30 degrees relative to a substrate plane of the optical waveguide.

14. The method of claim 13 wherein the mode is a transverse magnetic (TM) mode.

15. The method of claim 7 wherein the forming the overlay strip comprises forming a polysilicon layer having an overlay width no greater than a waveguide width of the optical waveguide and an overlay length at least long enough to satisfy the first offset distance and the second offset distance.

16. The method of claim 15 wherein the overlay length includes a tolerance to accommodate registration and fabrication errors along an axis of propagation for the optical waveguide.

17. A photonic circuit, comprising:
a polarization splitter configured to separate a received optical signal into a first mode and a second mode, wherein the first mode and the second mode are orthogonal with respect to each other;
a waveguide polarization rotator having:
an optical waveguide having an input end and an output end oppositely disposed thereon, the optical waveguide operable to receive, at the input end coupled to the polarization splitter, the first mode having an input polarization and generate, at the output end, an output optical signal having an output polarization orthogonal to the input polarization, and
an overlay strip disposed over and non-orthogonally crossing the optical waveguide, and having a first end laterally offset from the optical waveguide by a first offset distance and a second end laterally offset from the optical waveguide by a second offset distance, wherein the optical waveguide has a waveguide width and the overlay strip has an overlay width no greater than the waveguide width; and
a filter coupled to the output end of the waveguide polarization rotator, and configured to apply a transfer function designed for the second mode to the output optical signal from the waveguide polarization rotator.

18. The photonic circuit of claim 17 wherein the first mode is a transverse electric (TE) mode.

19. A waveguide polarization rotator, comprising:
an optical waveguide having an input end and an output end oppositely disposed thereon, the optical waveguide operable to:
receive, at the input end, an input optical signal having a mode having an input polarization, and
generate, at the output end, an output optical signal having an output polarization orthogonal to the input polarization; and
an overlay strip disposed over and non-orthogonally crossing the optical waveguide, and having a first end laterally offset from the optical waveguide by a first offset distance and a second end laterally offset from the optical waveguide by a second offset distance, wherein the overlay strip comprises polysilicon.

20. The waveguide polarization rotator of claim 19, wherein the optical waveguide comprises a silicon nanowire waveguide.

21. The waveguide polarization rotator of claim 19 further comprising a cladding layer disposed between the optical waveguide and the overlay strip.

22. A waveguide polarization rotator, comprising:
an optical waveguide having an input end and an output end oppositely disposed thereon, the optical waveguide comprising a silicon nanowire waveguide, and the optical waveguide operable to:
receive, at the input end, an input optical signal having a mode having an input polarization, and
generate, at the output end, an output optical signal having an output polarization orthogonal to the input polarization; and
an overlay strip disposed over and non-orthogonally crossing the optical waveguide, and having a first end laterally offset from the optical waveguide by a first offset distance and a second end laterally offset from the optical waveguide by a second offset distance.

23. The waveguide polarization rotator of claim 22 further comprising a cladding layer disposed between the optical waveguide and the overlay strip.

* * * * *